(12) United States Patent
Selfridge

(10) Patent No.: US 9,530,412 B2
(45) Date of Patent: Dec. 27, 2016

(54) SYSTEM AND METHOD FOR MULTI-AGENT ARCHITECTURE FOR INTERACTIVE MACHINES

(71) Applicant: AT&T Intellectual Property I, L.P., Atlanta, GA (US)

(72) Inventor: Ethan Selfridge, Somerville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 132 days.

(21) Appl. No.: 14/473,288

(22) Filed: Aug. 29, 2014

(65) Prior Publication Data

US 2016/0063992 A1    Mar. 3, 2016

(51) Int. Cl.
*G10L 15/00* (2013.01)
*G10L 15/22* (2006.01)

(52) U.S. Cl.
CPC .............. *G10L 15/22* (2013.01); *G10L 15/222* (2013.01); *G10L 2015/227* (2013.01)

(58) Field of Classification Search
None
See application file for complete search history.

(56) References Cited

U.S. PATENT DOCUMENTS

| | | | |
|---|---|---|---|
| 4,587,670 A * | 5/1986 | Levinson | G10L 15/142 704/256 |
| 6,567,778 B1 * | 5/2003 | Chao Chang | G06F 17/278 704/257 |
| 6,651,043 B2 | 11/2003 | Ammicht et al. | |
| 7,647,225 B2 * | 1/2010 | Bennett | G06F 17/3043 704/251 |
| 8,060,364 B2 | 11/2011 | Bachar et al. | |
| 8,150,698 B2 | 4/2012 | Ativanichayaphong et al. | |
| 8,326,634 B2 | 12/2012 | Di Cristo et al. | |
| 8,515,765 B2 | 8/2013 | Baldwin et al. | |
| 8,645,122 B1 | 2/2014 | Di Fabbrizio et al. | |
| 8,731,929 B2 | 5/2014 | Kennewick et al. | |

(Continued)

OTHER PUBLICATIONS

Busoniu et al., "A comprehensive survey of muitiagent reinforcement learning," *IEEE Transactions on Systems, Man, and Cybernetics; Part C: Applications and Reviews*, 2008, 38(2):156-172.

(Continued)

*Primary Examiner* — Marcus T Riley

(57) ABSTRACT

Systems, methods, and computer-readable storage devices are for an event-driven multi-agent architecture improves via a semi-hierarchical multi-agent reinforcement learning approach. A system receives a user input during a speech dialog between a user and the system. The system then processes the user input, identifying an importance of the user input to the speech dialog based on a user classification and identifying a variable strength turn-taking signal inferred from the user input. An utterance selection agent selects an utterance for replying to the user input based on the importance of the user input, and a turn-taking agent determines whether to output the utterance based on the utterance, and the variable strength turn-taking signal. When the turn-taking agent indicates the utterance should be output, the system selects when to output the utterance.

18 Claims, 7 Drawing Sheets

(56) References Cited

U.S. PATENT DOCUMENTS

| | | | |
|---|---|---|---|
| 8,914,288 B2* | 12/2014 | Williams | G10L 15/04 704/253 |
| 2002/0147593 A1* | 10/2002 | Lewis | G10L 15/22 704/275 |
| 2003/0061029 A1* | 3/2003 | Shaket | G06F 17/279 704/9 |
| 2004/0034531 A1 | 2/2004 | Chou et al. | |
| 2004/0095389 A1* | 5/2004 | Sidner | G06F 9/4443 715/764 |
| 2006/0095524 A1* | 5/2006 | Kay | G06Q 10/107 709/206 |
| 2006/0200350 A1* | 9/2006 | Attwater | G10L 15/08 704/251 |
| 2008/0010069 A1 | 1/2008 | Katariya et al. | |
| 2009/0094031 A1 | 4/2009 | Tian et al. | |
| 2010/0036660 A1* | 2/2010 | Bennett | G10L 17/26 704/231 |
| 2010/0076753 A1 | 3/2010 | Doi et al. | |
| 2010/0268529 A1 | 10/2010 | Sone | |
| 2010/0312556 A1* | 12/2010 | Ljolje | G10L 15/07 704/244 |
| 2013/0317826 A1 | 11/2013 | Jerram et al. | |

OTHER PUBLICATIONS

Buβ et al., "DIUM—An incremental diaogue manager that can produce self-corrections," *Proceedings of semdial*, 2010.

Cuayahuiti et al., "Evaluation of a hierarchical reinforcement learning spoken dialogue system," *Computer Speech Language*, 2010; 24(2)395-429.

Dethlefs et al., "Optimising incremental dialogue decisions using information density for interactive systems," In *Proceedings of the Conference on Empirical Methods in Natural Language Processing (EMNLP)*, 2012.

Goffin et al., "The At&T WATSON speech recognizer," In *Proceedings of ICASSP*, 2006, pp. 1033-1036.

Gravano et al., "Turn-taking cues in task-onented dialogue," *Computer Speech & Language*, 2011, 25(3):601-634.

Heeman et al., "Combining reinforcement learning with information-state update rules," In *Proceedings of the Annual Conference of the North American Association for Computational Linguistics*, Rochester, NY; 2007, pp. 268-275.

Jonsdottir et al., "Learning smooth, human-like turntaking in realtime dialogue," In *IVA '08: Proceedings of the 8$^{th}$ international conference on Intelligent Virtual Agents*, Berlin, Heidelberg, Springer-Verlag, 2008, pp. 162-175.

Nishimoto et al., "Decision of response timing for incremental speech recognition with reinforcement learning," In *IEEE Workshop on Automatic Speech Recognition and Understanding (ASRU)*, 2011, pp. 467-472.

Raux et al., "Optimizing the turn-taking behavior of task-oriented spoken dialog systems," *ACM Transactions on Speech and Language Processing (TSLP)*, 2012, 9(1):1.

D. Schlangen, "From reaction to prediction: Experiments with computational models of turn-taking." In *Ninth International Conference on Spoken Language Processing*, 2006.

Selfridge et al., "Importance-Driven Turn-Bidding for spoken dialogue systems," In *Proc. of ACL 2010*, Association for Computation Linguistics, 2010; pp. 177-185.

Selfridge et al., "A temporal simulator for developing turn-taking methods for spoken dialogue systems," In *Proceedings of SIGdial*, 2012.

Selfridge et al., "Integrating incremental speech recognition and POMDP-based dialogue systems," In *Proceedings of SiGdial*, 2012.

Selfridge et al., "Continuously predicting and processing barge-in during a live spoken dialogue task," In *Proceedings of SiGdial*, 2013.

Will Styler, "The enronsent corpus," *Boulder: University of Colorado at Boulder Institute of Cognitive Science*, 2011.

Sutton et al., "Reinforcement Learning," MIT Press, 1998.

Yang et al., "Initiative conflicts in task-oriented dialogue," *Computer Speech & Language*, 2010, 24(2)175-189.

Pinto et al., "The senior companion multiagent dialogue system," *Proceedings of the 7$^{th}$ International Joint Conference on Autonomous Agents and Muitiegent Systems—vol. 3*, International Foundation for Autonomous Agents and Multiagent systems, 2008.

Chung et al., "A dynamic vociabuiary spoken dialogue interface" *Proc. ICSLP*, 2004.

* cited by examiner

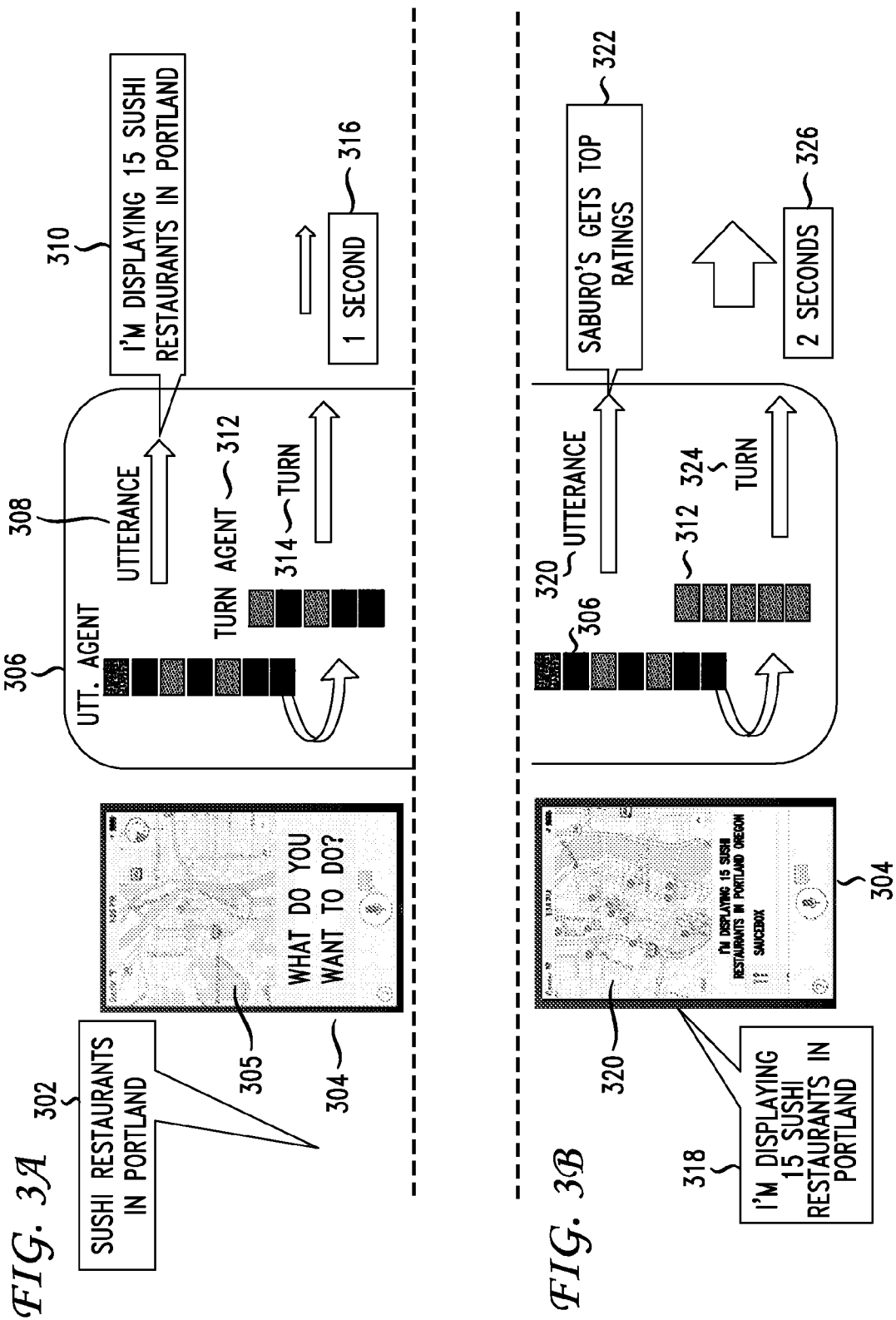

SYSTEM AND METHOD FOR MULTI-AGENT ARCHITECTURE FOR INTERACTIVE MACHINES

BACKGROUND

1. Technical Field

The present disclosure relates to speech dialog systems and more specifically to using a multi-agent architecture to determine what utterance should be output by the speech dialog system and when/if the utterance should be output.

2. Introduction

Spoken dialogue systems are quickly becoming a component of everyday life and turn-taking, the transition of speaking roles in a dialogue, is a critical. Research in human-human turn-taking has shown that the turn-release in human-human dialogue can be predicted and that both prosodic and contextual features are important to predicting turn-transitions. Consistent with this, much work has emphasized "smooth" human-machine turn-taking, where the system should not plan to speak until the user has finished speaking. This work has focused on predicting the user's turn-release by either contextual or prosodic features. Other work has focused on systems that can explicitly overlap system speech with user speech to either preempt the full user utterance or produce a backchannel. These approaches leverage incremental speech recognition and some aspects of reinforcement learning. However, with some exceptions, the majority of machine turn-taking approaches have focused on modeling the surface features of human turn-taking and initiative, such as speaking in turns and how to react to interruptions, rather than the relative importance of the utterances being received and delivered.

BRIEF DESCRIPTION OF THE DRAWINGS

FIGS. 3A, 3B, and 3C illustrate an exemplary dialog using a multi-agent architecture;

DETAILED DESCRIPTION

A system, method and computer-readable storage devices are disclosed for providing an event-driven multi-agent architecture and a semi-hierarchical multi-agent reinforcement learning approach that work in tandem. A system configured according to this disclosure receives a user input during a speech dialog between a user and the system. The system processes the user input, identifying an importance of the user input to the speech dialog based on both context of the dialogue and a variable strength turn-taking signal inferred from the user input. An utterance selection agent selects an utterance for replying to the user input based on the importance of the user input while a turn-taking agent determines when to output the utterance based on the potential importance of the utterance to the success of the dialog as a whole. The utterance selection agent is concerned with what to say and the turn-taking selection agent is concerned with how to say it.

Various embodiments of the disclosure are described in detail below. While specific implementations are described, it should be understood that this is done for illustration purposes only. Other components and configurations may be used without parting from the spirit and scope of the disclosure. A brief introductory description of a basic general purpose system or computing device in FIG. 1 which can be employed to practice the concepts, methods, and techniques disclosed is illustrated. A more detailed description of the event-driven multi-agent architecture with a semi-hierarchical multi-agent reinforcement learning approach will then follow, accompanied by descriptions of various embodiments and configurations. These variations shall be described herein as the various embodiments are set forth. The disclosure now turns to FIG. 1.

Figure 1:
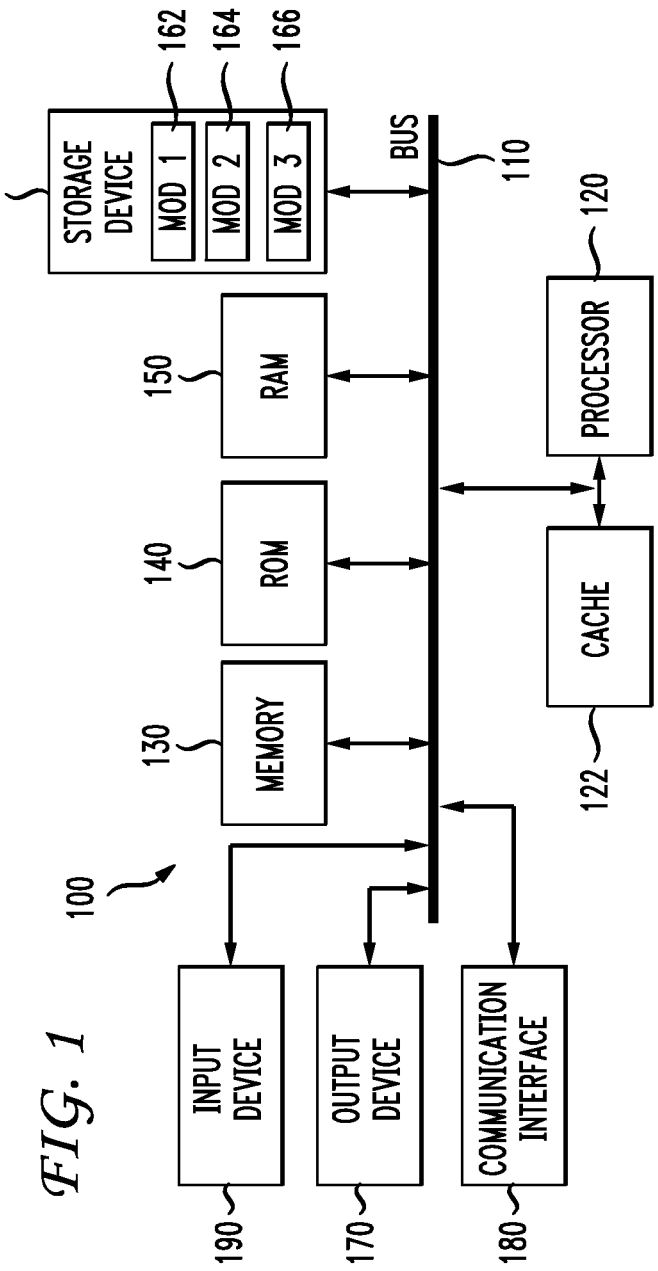
FIG. 1 illustrates an example system embodiment.

With reference to FIG. 1, an exemplary system and/or computing device 100 includes a processing unit (CPU or processor) 120 and a system bus 110 that couples various system components including the system memory 130 such as read only memory (ROM) 140 and random access memory (RAM) 150 to the processor 120. The system 100 can include a cache 122 of high-speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various operations or actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the processor. The processor 120 may be a self-contained computing system, containing multiple cores or processors, a bus, memory controller, cache, etc. A multi-core processor may be symmetric or asymmetric. The processor 120 can include multiple processors, such as a system having multiple, physically separate processors in different sockets, or a system having multiple processor cores on a single physical chip. Similarly, the processor 120 can include multiple distributed processors located in multiple separate computing devices, but working together such as via a communications network. Multiple processors or processor cores can share resources such as memory 130 or the cache 122, or can operate using independent resources. The processor 120 can include one or more of a state machine, an application specific integrated circuit (ASIC), or a programmable gate array (PGA) including a field PGA.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 160 can include software modules 162, 164, 166 for controlling the processor 120. The system 100 can include other hardware or software modules. The storage device 160 is connected to the system bus 110 by a drive interface. The drives and the associated computer-readable storage devices provide nonvolatile storage of computer-readable instructions, data structures, program modules and other data for the computing device 100. In one aspect, a hardware module that performs a particular function includes the software component stored in a tangible computer-readable storage device in connection with the necessary hardware components, such as the processor 120, bus 110, display 170, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 100 is a small, handheld computing device, a desktop computer, or a computer server. When the processor 120 executes instructions to perform "operations", the processor 120 can perform the operations directly and/or facilitate, direct, or cooperate with another device or component to perform the operations.

Although the exemplary embodiment(s) described herein employs the hard disk 160, other types of computer-readable storage devices which can store data that are accessible by a computer, such as magnetic cassettes, flash memory cards, digital versatile disks (DVDs), cartridges, random access memories (RAMs) 150, read only memory (ROM) 140, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage devices. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

One or more parts of the example computing device 100, up to and including the entire computing device 100, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 120 can include all types of processors disclosed herein, including a virtual processor. However, when referring to a virtual processor, the processor 120 includes the software components associated with executing the virtual processor in a virtualization layer and underlying hardware necessary to execute the virtualization layer. The system 100 can include a physical or virtual processor 120 that receive instructions stored in a computer-readable storage device, which cause the processor 120 to perform certain operations. When referring to a virtual processor 120, the system also includes the underlying physical hardware executing the virtual processor 120.

Having disclosed some components of a computing system, the disclosure now provides a more detailed description of the event-driven multi-agent architecture and a semi-hierarchical multi-agent reinforcement learning approach. The multi-agent architecture is an event driven multi-agent interaction framework that, leveraging both Information State (IS) and Reinforcement Learning (RL) techniques, supports both content (e.g. speech acts) and temporal decisions (e.g. turn-taking) "Agent" refers to different decision agents. As in traditional Artificial Intelligence (AI), where multiple agents can coordinate their actions to clean a room, the disclosed multi-agent architecture uses multiple agents to coordinate system behavior using multi-agent reinforcement learning. One key benefit of this approach is that the state space can be partitioned and distinct reinforcement algorithms can be applied to separate decision agents.

In general, a multi-agent architecture as disclosed herein can consume events and produce actions that span both content and temporal decisions. Where a standard dialogue system's action space might be limited to some speech act, the multi-agent architecture is designed to coordinate multiple action types such as utterance, display, utterance onset, and display onset. Each high-level action type is called a decision. For example, the utterance decision could be "request," the display decision could be "move map," and the onset decision could be "3 seconds." In this way, the multi-agent architecture has a clear process for selecting and coordinating joint actions.

The multi-agent architecture processes input using understanding and deliberation rule sets and the decision agents (implemented as rule sets) apply their respective policies to select an action for each decision. Two decisions described herein are utterance and utterance onset. However, other decisions such as volume, prosodic emphasis, and/or multi-modal display can easily be incorporated into the multi-agent architecture structure and are within the importance-driven approach disclosed herein, and can be used in addition to or as an alternative to the decisions discussed herein.

Figure 2:
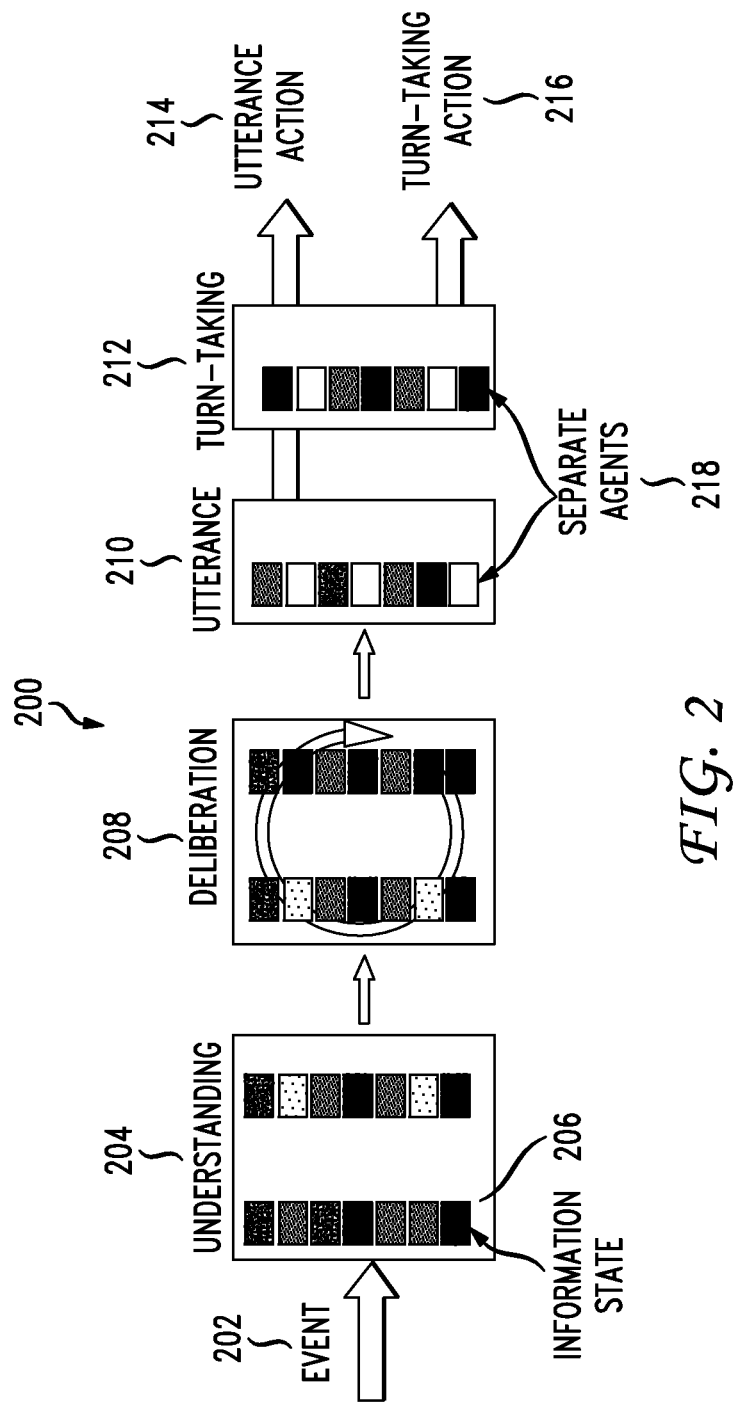
FIG. 2 illustrates an exemplary multi-agent architecture.

FIG. 2 provides a visualization of a multi-agent architecture 200. Each event 202 represents a decision point, as the multi-agent architecture 200 updates whenever an event 202 of interest is detected. These decision points are dependent on instrumentality. Using understanding and deliberation rule sets (204,206) and the decision agents 218 (implemented as rule sets) apply their respective policies to select an action for each decision. In the simple case, where the system is not reacting to incremental results, the information state 206 is updated when user speech starts, when system speech starts, on every final speech recognition result, and when system speech stops. When operating incrementally, the multi-agent architecture also updates on every partial result using an Incremental Interaction Manager. The information state 206 is used by the system in understanding 204 and deliberating 208 on the speech results. That is, the understanding 204 and deliberation 208 steps, modules, or components, both (1) use the information state 206 to correctly recognize speech and (2) utilize the current speech recognition results and the system outputs to update the information state 206.

Having recognized the speech and determined a current information state 206, the utterance decision agent 210 selects which of the potential speech acts to use for a given dialogue context. That is, the utterance decision agent 210 selects the utterance action 214 to be performed. Once selected, the utterance action 214 can have two stages. The first stage updates the state at the time of the action's selection, and is used to indicate that the system has the intention of speaking a particular utterance. The second stage is activated after the utterance 214 has been said, allowing for the system to have so-called "output awareness", in that its second stage updates the state based on what was actually said and not just the intended speech act. This is applicable in two different scenarios. First, the utterance 214 may never actually be said as the user may speak before the utterance's onset. Second, as user barge-in may truncate the utterance, the second stage synchronizes the multi-agent architecture 200 information state 206 with the environment. This type of grounding has been commonly handled in the understanding rule sets. Yet, because the second component is generally specific to each utterance, this other approach needlessly increases the complexity of the understanding rule set 204. Moreover, our approach to output awareness includes the second stage within the action specification, which increases the modularity and mobility of the utterance decision agent 210.

The turn-taking decision agent 212 controls when the system does and does not speak the utterance action 214 selected by the utterance decision agent 210. Three different interaction contexts are broadly defined, within which different system turn-taking actions will be applicable: onset, when both the system and user are silent; continue/pause, when the system is speaking and the user is speaking; and react/ignore, when the system is silent and the user is speaking. It is noted there is a fourth dimension, where the recognizer is active but the user is not speaking.

The onset case is the general interaction context where an utterance has just finished and enables the system to choose the utterance's onset based on its importance and so bid for the turn. This is the so-called "turn-bidding" behavior. The continue/pause case is the user barge-in context where the system needs to determine how to respond to the environment-initiated overlapping input. The react/ignore case applies to active incremental speech recognition during system silence where "react" means to start speaking and "ignore" to remain silent. The prediction-based barge-in response model is a hand-crafted policy of the latter two cases.

In summary regarding the structure of the multi-agent architecture, the multi-agent architecture can allow for pauses and breaks between system utterances, the ability to explicitly reason during overlapping speech, and the ability to react to or ignore incremental results. Moreover, the event-driven nature of the multi-agent architecture frees it from explicitly incorporating time into its Information State 206.

Figure 3C:
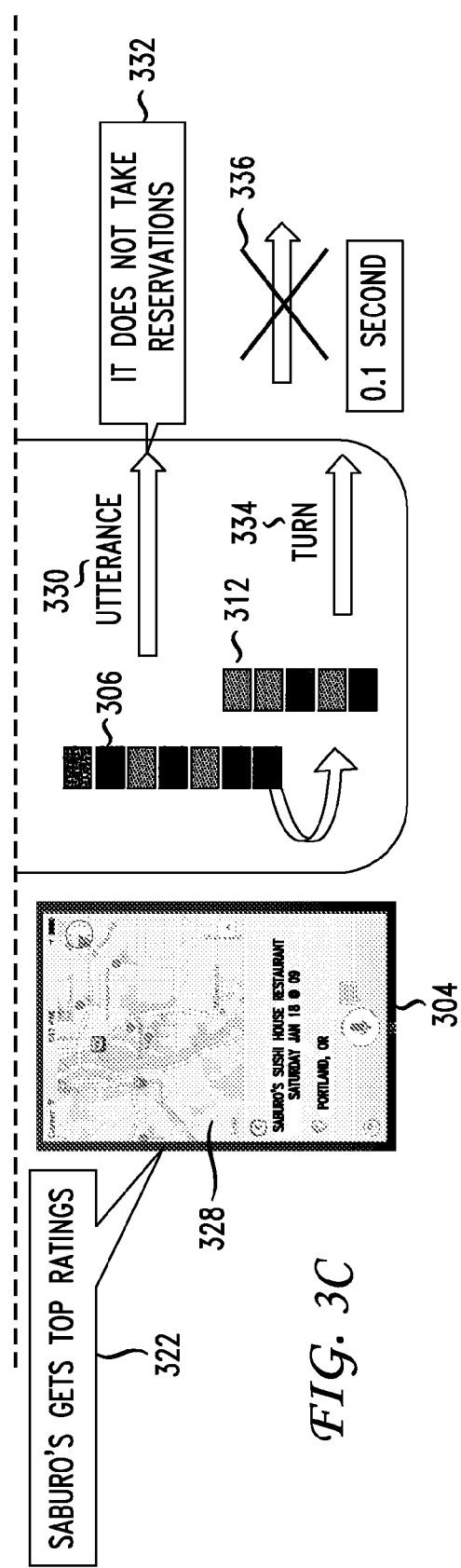

FIGS. 3A-3C illustrate an exemplary dialog using the multi-agent architecture. In FIG. 3A, a user initiates a speech dialog with a user device 304 configured according to this disclosure. The user device 304 can be a computer, a smart-phone, a tablet, a workstation, or any other computing device capable of interacting with the user via a speech dialog. In this case, the user device 304 is displaying a current location 305 of the user. The user's initiating action is to state, "Sushi restaurants in Portland" 302. In other configurations, the user action can be a multi-modal request, incorporating both a spoken modality and another modality input. Other exemplary modalities include touching the user device 304 in at least one location, tilting, shaking, or otherwise moving the user device 304, and/or otherwise moving while holding the user device 304.

As the user speaks the initial utterance a query, 302, the user device 304 recognizes the speech, then forwards the recognized text/query/information state to an understanding agent 306. The utterance agent 306 identifies an utterance 308 for replying to the query 302. The utterance agent 306 identifies the utterance 308 based on factors which can include the type of user (i.e., expert, novice, professional, non-native, local, visitor, elderly, youth, level of education, socio-economic status, native language), the identity of the user, past user queries, and/or previous user actions (places visited, identified/selected preferences). The turn-taking agent 312 and the utterance agent 306 can be semi-hierarchical (as illustrated), with one agent acting first (in this case, the understanding agent 306) and the other agent acting second (in this case, the turn-taking agent 312). In semi-hierarchical configurations, the second acting agent can make decisions based on the action selected by the first acting agent as well as other factors. For example, as illustrated, the turn-taking agent 312 can base the timing decision based on the utterance 310 selected by the utterance agent 306. In other configurations, the utterance agent 306 and the turn-taking agent 312 can be in alternative orders (i.e., the turn-taking agent 312 can go first, with the utterance agent 306 using the turn 314 decision in the utterance selection process), in parallel, and/or can alternate order within the hierarchy based on specific events.

In the illustrated example, the turn-taking agent 312, having made a turn decision 314 based on the utterance action 310 selected by the utterance agent 306, determines a 1 second 316 duration should exist before the user device 304 provides the next utterance. FIG. 3B illustrates the user device 304 speaking the utterance 318 selected by the utterance agent 306 in FIG. 3A 1 second after the initial utterance 302. As the user device 304 provides the utterance 318, the user device also updates the display to include, in addition to the user's current location, additional locations associated with the query. In the illustrated example, the selected utterance 310 and the corresponding output speech 318 is "I'm displaying 15 sushi restaurants in Portland," and the display 320 is modified to show those 15 sushi locations. Having performed an action, or an event occurring, the utterance agent 306 again determines what utterance action 320 should follow the events. In this case, the utterance agent 306 determines the next utterance should inform the user which of the 15 options is the best, so the utterance agent 306 identifies "Saburo's gets the top ratings" 322 as the next utterance to be output to the user. The turn-taking agent 312, still in a semi-hierarchical architecture, relies on the selected utterance 322 (and/or other factors) and determines the next turn 324 (i.e., the next output of the user device) should occur 2 seconds 326 after outputting the previous utterance 318.

In FIG. 3C, the 2 seconds identified by the turn-taking agent 312 as needed before outputting the selected utterance 322 in FIG. 3B have passed and the user device 304 outputs a spoken version of the selected utterance 322. In addition, the user device 304 again updates the display to mirror the spoken utterance 322. For example, as illustrated the utterance 32 2 selected and spoken is "Saburo's gets the top ratings," so the display is updated to illustrate where Saburo's is located. The multi-agent architecture again begins to process the events, with the utterance agent 306 selecting the next appropriate utterance 330 to output, which is "It does not take reservations," 332. The turn-taking agent 312 considers the events, circumstances, selected utterance 332, etc., and determines the subsequent turn 334 should not be executed. That is, the proximate turn 336 should not occur (illustrated by the "X" over the turn symbol), and the selected utterance 332, despite having been selected by the utterance agent 306. A time of "0.1" seconds is indicated, meaning the silence associated with not outputting an utterance should begin immediately following the previous output 322.

While the exemplary illustrations of FIG. 3A-3C show a map display, the user device 304 is not restricted to such a display. Instead, the display of the user device can be adjusted to any applicable display based on the events occurring, the speech received from the user, applicable queries, and/or other elements of the speech dialog. Also, while the illustrated speech dialog shows the system/user device 304 providing multiple responses without additional input from the user, other speech dialogs can require additional input from a user, wait variable amounts of time, adjust for "barge-in" circumstances, and/or repeating an utterance.

Figure 4:
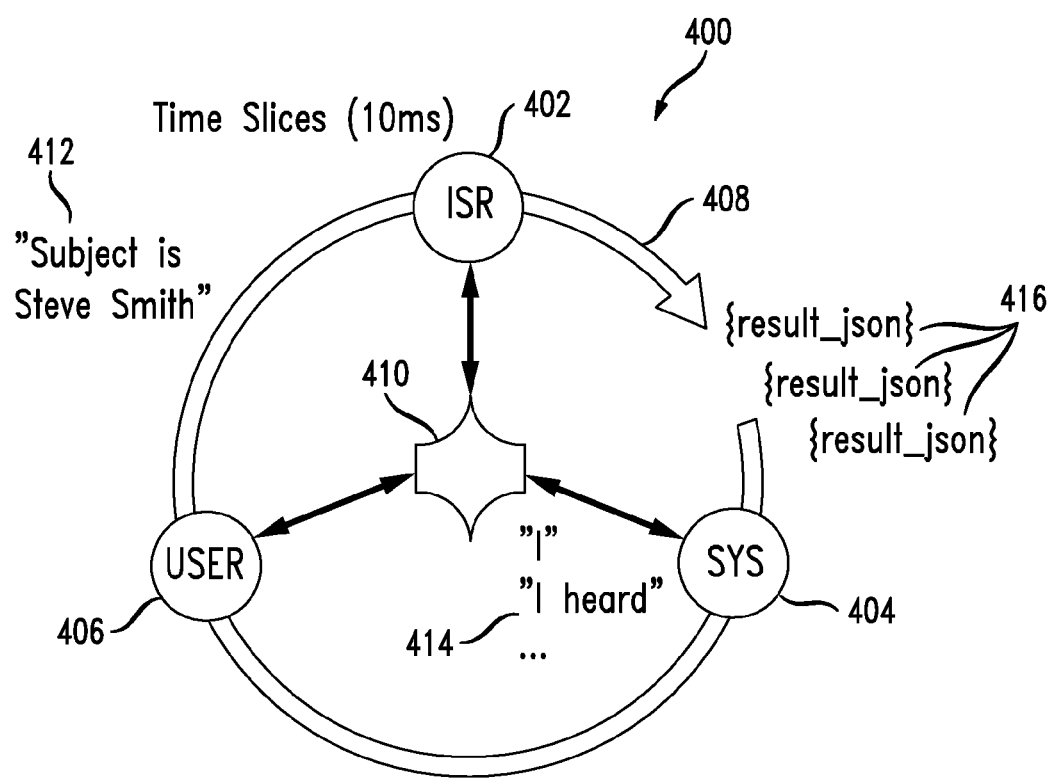
FIG. 4 illustrates a multi-agent architecture interacting during a speech dialog.

FIG. 4 illustrates an exemplary multi-agent architecture 400 interacting during a speech dialog. In the illustrated multi-agent architecture 400, three agents are present: a System agent 404, which performs natural language understanding, interaction management, and/or natural language generation; a User agent 406 which performs input understanding, internal reasoning, and/or output reasoning; and an Incremental Speech Recognition (ISR) agent 402 which performs voice activity detection. The agents are governed by a number of timing and content parameters which can be hand-crafted and/or estimated from data. As a speech dialog progresses in time 408, the illustrated multi-agent architecture 400 makes determinations and identifications. For example, the ISR agent 402 identifies that voice activity has been detected and provides a number of speech results 416. The system agent 404 interprets the speech results, providing possible interpretations 414. From these possible interpretations, the user agent 406 reasons "Subject is Steve Smith" 416. Each of the agents 402, 404, 406 can exchange information (or information states) via an exchange hub 410 or data storage which is commonly accessible to all agents in the multi-agent architecture 400.

It is noted that the illustrated multi-agent architecture 400 can be used to simulate incremental speech recognition without data, thereby creating a large set of potential user utterances. In addition, the multi-agent architecture 400 can perform synthesis of utterances and create recognition files, run recognition, and collect partial results. In addition, the architecture 400 can use reference and recognition time stamps within a temporal simulation framework to establish learning guidelines.

Figure 5:
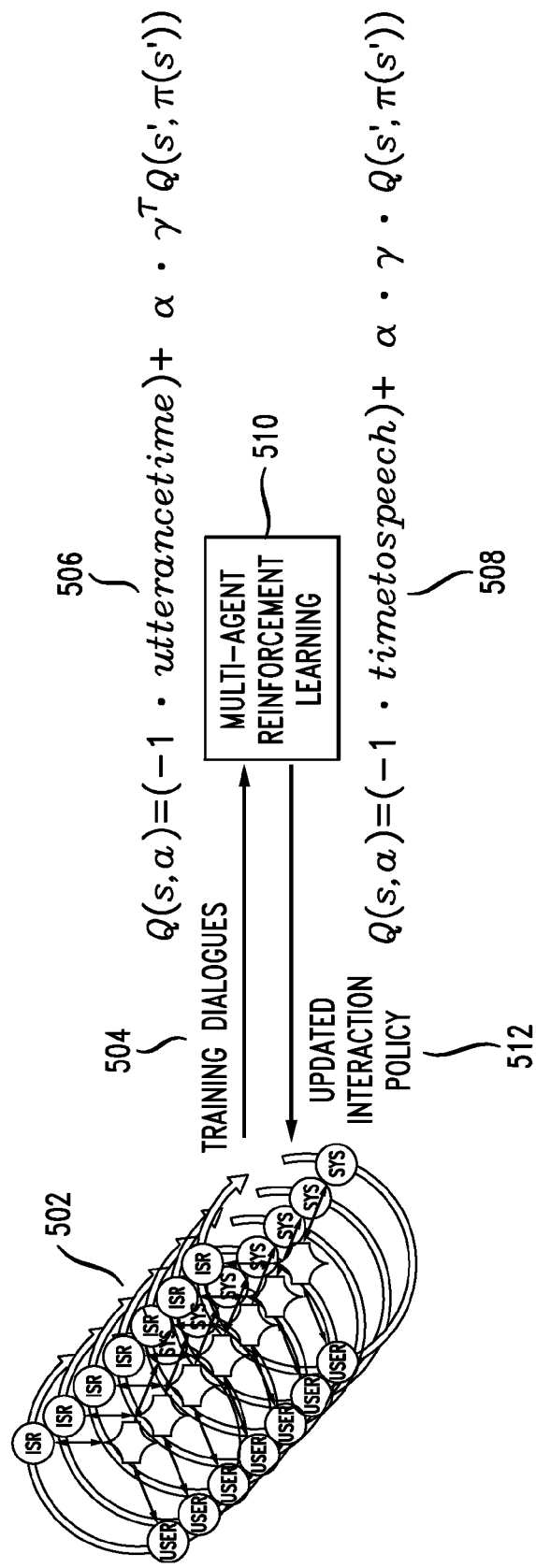
FIG. 5 illustrates training of a multi-agent architecture using a semi-hierarchical multi-agent reinforcement learning approach.

FIG. 5 illustrates training of a multi-agent architecture using a semi-hierarchical multi-agent reinforcement learning approach. The semi-hierarchical multi-agent reinforcement learning approach described can apply to any multi-agent architecture as described herein (such as the architecture illustrated in FIG. 2 and the architecture illustrated in FIG. 4). However, for sake of clarity, the following description is made using the architecture as illustrated in FIG. 4. The reinforcement learning approach finds optimal utterance and turn-taking policies which make up an interaction policy. An utterance policy is a mapping from context to speech act and a turn-taking policy is a mapping from context to turn-taking action.

The reinforcement learning approach described herein revises the agents/rules which make up the multi-agent architecture at any given time. FIG. 5 illustrates each of these models 502 as they are updated, with the new version supplementing/replacing the previous version. As additional training dialogues 504 are received (including "real-time" training by adapting to ongoing speech dialogues), the system seeks to adapt by applying multi-agent reinforcement learning 510 using two equations 506, 508, described in greater detail below. One equation 506 is used to update the utterance agent rules in the multi-agent architecture, whereas the other equation 508 is used to update the turn-taking agent rules in the multi-agent architecture. The updates are illustrated by the "updated interaction policy" 512, which results in an updated multi-agent architecture in the models 502.

The described reinforcement learning approach uses separate Markov Decision Processes for utterance and turntaking decisions instead of a joint Markov Decision Process. The multi-agent approach supports a specific set of state features and learning procedures for each decision type, drastically reducing training time and increasing generalizability. One issue with multi-agent systems can be that the non-stationary nature of the each agent's policy can lead to training difficulties unless specifically handled. Here, coordination is enforced by using a cascade approach. Each decision is performed in the same order at every decision point and the results of that decision are a state feature for the next decision. Since the outcomes of previous decisions constrain the potential actions of the next, the learning structure itself is semi-hierarchical though rewards are not propagated between decision state-action pairs as done in standard hierarchical reinforcement learning. After a dialogue, each decision agent receives the same fixed reward and applies a decision agent specific reward function to it. The specific reward functions will be described shortly.

In learning utterance decisions, the learner should only reinforce the subset of utterances that were actually produced, as opposed to those that were only intended to be spoken. The second stage of the utterance action, which is only active after the utterance is actually produced, facilitates this conditional reinforcement. Indeed, the Q-Score should only be updated if a sufficient percentage of the utterance is said, the percentage being defined by the second stage. For instance, if user barge-in occurs within 300 milliseconds of starting the prompt than one can assume it is an "initiative conflict" situation and so the user is probably not reacting to the prompt. In this case, the Q-Score should not be updated. However, if the system has succeeded in producing enough of the utterance, then the Q-Score should be updated and (currently) the system assumes that the utterance has been grounded and understood.

Utterance Q-scores are updated using a Q-Learning variant shown in Equation 1, which seeks to minimize system speech time. The reward at each state is the combination of the (negative) amount of utterance time and the discounted estimate of the next on-policy Q-score ($Q(s',\pi(s'))$). This variant modifies the discount by $\tau$, which represents the number of utterance decisions that were not spoken since the last system utterance and was inspired by semi-Markov decision process-based approaches. Informal experimentation has found it critical to learning a proper utterance policy. The a value used here is proportional to the number of times the state-action pair has been seen: $1/\sqrt{(SA_{count})}$.

$$Q(s,a) = (-1 \cdot utteranceTime) + \alpha \cdot \gamma^\tau Q'(s', \pi(s')) \quad \text{Equation 1:}$$

Unlike utterance decisions, turn decision Q-Scores are always updated since turn-taking decisions, which determine onset, always influence the dialogue outcome. The turn-taking Q-Scores are updated based on the time between when the decision was made and when the next utterance (either user or system) occurs (Equation 2).

This updating scheme directs the system to always choose higher (faster) bids, as these have less time to speech. However, it also reinforces the use of lower bids if it expects the user to say something that will advance the dialogue. The alpha value used here is the same as for the utterance decisions. Taking time into account, the turn-taking equation is as follows.

$$Q(s,a) = (-1 \cdot timeTilSpeech) + \alpha \cdot \gamma \cdot Q'(s', \pi(s')) \quad \text{Equation 2:}$$

The importance-driven approach has two fundamental components: a variable strength turn-taking signal (manifested here by utterance onset) that is determined by utterance importance, and the use of reinforcement learning to estimate this importance. The variable strength turn-taking signal can further be inferred based on user characteristics (such as the prosody of the user speech), past reactions of the user (both within the speech dialog and interactions prior to the speech dialog), subject matter, and/or other rules as needed for a particular configuration.

Turn-taking decisions can be constrained based on what turn-taking framework is being used. For example, in a three bid framework the decision structure could be as follows; bid high (speak in 0.1 seconds), bid mid (speak in 2 seconds), and bid low (speak in 10 seconds). These times are exemplary only—other time periods are equally usable. For example, more fine grained onsets can be valuable. User barge-in can also be disabled for all system prompts, or can be incorporated into the action structure.

Using the multi-agent reinforcement framework described herein, the system can make implicit decisions regarding the type of User. For instance, there are many scenarios where User behavior is dependent on the presence or absence of multiple attributes that a reflected on only the interaction of temporal and content decisions by the User. By being about to implicitly learn the optimal interaction policy, the same system can handle multiple user types. One example is where an "expert" user does not require explicit system prompts whereas a "novice" does. See Table 1 for a differentiating example.

T multi-agent reinforcement framework described learns sophisticated behaviors that conventional systems are incapable of performing. For example, instead of confirming after every utterance, our system learns to attempt to accumulate as much body as possible without confirming. It can then confirm multiple body phrases at once, and only use one confirmation lead-in phrase ("I thought you said . . . "). It does this accumulation by acknowledging with a high bid after every successful informative utterance and then prompts the user for more information using a middle bid rather than a high bid. This gives time for "experts" to supply more information without prompting, unlike a "novice" user. Table 1 provides an example of an expert and novice user.

Our architecture can also learn to adapt to the user with its utterance and turn-taking choices. One category of adaptation is Utterance Adaptation, where the system modifies its utterance selection. For instance, if the first acknowledgement ("ok") does not produce a user information action than our system will no longer use the acknowledge utterance and instead go directly to an information prompt. The fourth System utterance in Table 1 is an example of utterance adaptation; the system is confirming ("I thought you said . . . ") instead of acknowledging ("Ok") as it originally did in utterance one. Another category is Turn-Taking Adaptation, where the system modifies its turn-taking behavior. For instance, if initial behavior indicates that the user is a novice, then the system will upgrade any subsequent middle turn-taking onsets to high (since only an Expert would provide information without prompting). This reduces the amount of silence between system utterances. An illustration of Turn-Taking Adaptation is shown in the sixth system utterance of the Novice example in Table 1, where Nv=Novice, Ex=Expert, H=High, and M=Middle. This bid would be an M as it was in the second utterance. However, this utterance was successful, so the system can (implicitly) infer it is interacting with a Novice, and so middle bids will only take up more time. This kind of inference is done within the Reinforcement Learning framework.

TABLE 1

| Speaker | Turn | Utterance |
|---|---|---|
| Nv | — | i read through the report and it looks good |
| Sys | H | ok |
| Sys | M | Is there any more body? |
| Nv | — | yes |
| Sys | H | What is the body? |
| Nv | — | i have a few questions so lets chat . . . |
| Sys | H | i thought you said |
| Sys | H | i read through the report and it looks good |
| Sys | H | am I correct so far? |
| Nv | — | yes |
| Sys | H | i thought you said |
| Sys | H | I have a few questions so lets chat about . . . |
| Sys | H | is this correct? |
| Nv | — | yes |
| Ex | — | i read through the report and it looks good |
| Sys | H | ok |
| Ex | — | i have a few questions so lets chat about . . . |
| Sys | H | i thought you said |
| ID | H | i read through the report and it looks good |
| Ex | — | yes |
| ID | H | I have a few questions so lets chat about . . . |
| Ex | — | Yes |

A strength of the our approach is that it does not require a successful (or any) prediction of a user classification to provide a personalized experience. Instead, a successful prediction of a user classification can improve upon the personalized experience and/or reduce processing requirements, without detracting from personalized utterances and turn-taking More specifically, as illustrated by adaptation the reinforcement learning approach as described herein, can dynamically alter its interaction policy in response to different user types and the specific ways a user is interacting with the system.

Figure 6:
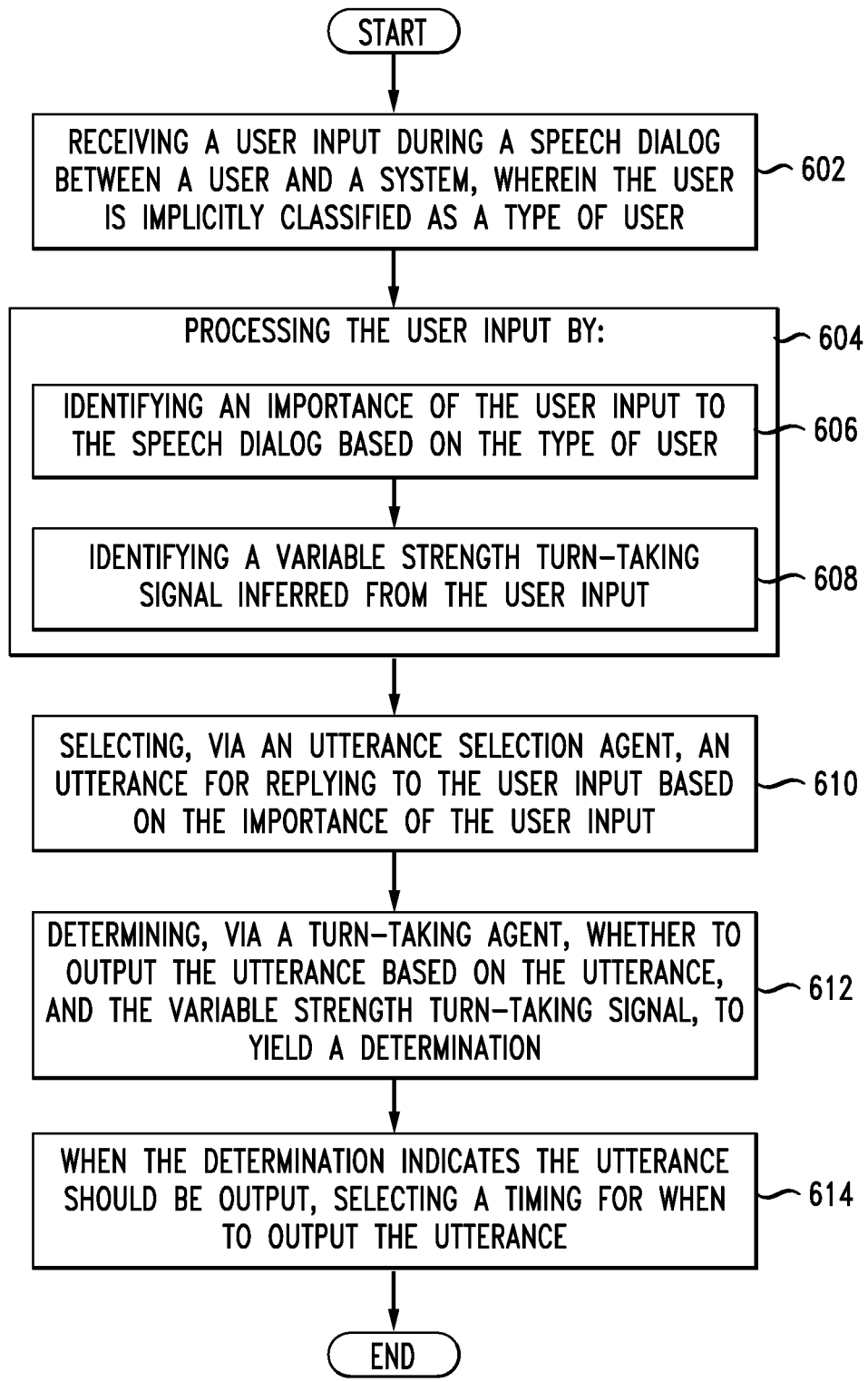
FIG. 6 illustrates an example method embodiment.

Having disclosed some basic system components and concepts, the disclosure now turns to the exemplary method embodiment shown in FIG. 6. For the sake of clarity, the method is described in terms of an exemplary system 100 as shown in FIG. 1 configured to practice the method. The steps outlined herein are exemplary and can be implemented in any combination thereof, including combinations that exclude, add, or modify certain steps.

A system 100 configured according to this disclosure receives a user input during a speech dialog between a user and a system, wherein the user is classified as a type of user (602). Such classification of the type of user can occur implicitly. For example, rather than classifying the type of user based on specific, known, user-profile type information, the system 100 can classify the type of user based on responses received and statements recorded. Exemplary types of user include, but are not limited to, experts, novices, professionals, amateurs, non-native, local, visitor, elderly, youth, a level of education classification, socio-economic status type, native language classification, etc. Exemplary user input can be a spoken command, silence (i.e., the user hasn't spoken for a period of time or has not interrupted system 100 output), and/or a multi-modal command (for example, touch+speech, speech+current location, etc.). The system 100 processes the user input (604) by identifying an importance of the user input to the speech dialog based on the type of user (606) and identifying a variable strength turn-taking signal inferred from the user input (608). These identifying processes 606, 608 can be performed serially or in parallel. The variable strength turn-taking signal can be inferred based on the utterance importance to the overall speech dialog, user characteristics (such as the prosody of the user speech), past reactions of the user (both within the speech dialog and interactions prior to the speech dialog), subject matter, and/or other rules as needed for a particular configuration.

The system 100 selects, via an utterance selection agent, an utterance for replying to the user input based on the importance of the user input (610). The system 100 also determines, via a turn-taking agent, whether to output the utterance based on the utterance and the variable strength turn-taking signal (612). The utterance selection agent and the turn-taking agent can both be Markov decision processes, and can be in a semi-hierarchical format where one agent is dependent on the other. For example, the turn-taking agent can be dependent on the utterance selection agent such that the turn-taking agent does not perform until the utterance selection agent performs, and vice versa. When the system 100 determines the utterance should be output, the system 100 selects a timing for when to output the utterance (614). For example, the system 100 can determine that the utterance should be output a second after a previous input/output, 10 seconds after a previous input/output, or never.

The system 100 can perform multi-agent reinforcement learning by repeating the receiving (602), the processing (604), the selecting (610), and the determining (614) throughout the course of a speech dialog and updating a first rule set used for identifying the importance of the user input and a second rule set for identifying the variable strength turn-taking signal in the user input. The first rule set can be based on reinforcing relatively short utterances using an equation such as Equation 1, listed above. The second rule set can be based on reinforcing a minimal time between the user input and the output of the utterance using an equation such as Equation 2, listed above. Such updating can occur after each utterance is output, or at any other time dictated by a specific configuration.

Embodiments within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. Combinations of the above should also be included within the scope of the computer-readable storage devices. Computer-readable storage devices exclude signals, carrier waves, and/or transmission media per se.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply to speech dialog systems generally and can be used for any application thereof. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

I claim:

1. A method comprising:
receiving a user input during a speech dialog between a user and a system, wherein the user is implicitly classified as a type of user;
processing the user input by:
identifying an importance of the user input to the speech dialog based on the type of user; and
identifying a variable strength turn-taking signal inferred from the user input;
selecting, via an utterance selection agent, an utterance for replying to the user input based on the importance of the user input;
determining, via a turn-taking agent, whether to output the utterance based on the utterance, and the variable strength turn-taking signal, to yield a determination;
when the determination indicates the utterance should be output, selecting a timing for when to output the utterance;
repeating the receiving, the processing, the selecting, and the determining throughout the speech dialog; and
updating a first rule set used for the identifying of the importance of the user input and a second rule set for the identifying of the variable strength turn-taking signal in the user input.

2. The method of claim 1, wherein the type of user is one of an expert and a novice.

3. The method of claim 1, wherein the updating occurs after the utterance is output.

4. The method of claim 1, wherein updating of the first rule set is based on reinforcing relatively short utterances.

5. The method of claim 1, wherein updating of the second rule set is based on reinforcing a minimal time between the user input and the output of the utterance.

6. The method of claim 1, wherein the utterance selection agent and the turn-taking agent are both Markov decision processes.

7. The method of claim 6, wherein the turn-taking agent is dependent on the utterance selection agent.

8. The method of claim 1, wherein the user input is silence.

9. A system comprising:
a processor; and
a computer-readable storage medium having instructions stored which, when executed by the processor, cause the processor to perform operations comprising:
receiving a user input during a speech dialog between a user and a system, wherein the user is implicitly classified as a type of user;
processing the user input by:
identifying an importance of the user input to the speech dialog based on the type of user; and
identifying a variable strength turn-taking signal inferred from the user input;
selecting, via an utterance selection agent, an utterance for replying to the user input based on the importance of the user input;
determining, via a turn-taking agent, whether to output the utterance based on the utterance, and the variable strength turn-taking signal, to yield a determination;
when the determination indicates the utterance should be output, selecting a timing for when to output the utterance;
repeating the receiving, the processing, the selecting, and the determining throughout the speech dialog; and
updating a first rule set used for the identifying of the importance of the user input and a second rule set for the identifying of the variable strength turn-taking signal in the user input.

10. The system of claim 9, wherein the type of user is one of an expert and a novice.

11. The system of claim 9, wherein the updating occurs after the utterance is output.

12. The system of claim 9, wherein updating of the first rule set is based on reinforcing relatively short utterances.

13. The system of claim 9, wherein updating of the second rule set is based on reinforcing a minimal time between the user input and the output of the utterance.

14. The system of claim 9, wherein the utterance selection agent and the turn-taking agent are both Markov decision processes.

15. The system of claim 14, wherein the turn-taking agent is dependent on the utterance selection agent.

16. The system of claim 9, wherein the user input is silence.

17. A computer-readable storage device having instructions stored which, when executed by a computing device, cause the computing device to perform operations comprising:
receiving a user input during a speech dialog between a user and a system, wherein the user is implicitly classified as a type of user;
processing the user input by:
identifying an importance of the user input to the speech dialog based on the type of user; and
identifying a variable strength turn-taking signal inferred from the user input;
selecting, via an utterance selection agent, an utterance for replying to the user input based on the importance of the user input;
determining, via a turn-taking agent, whether to output the utterance based on the utterance, and the variable strength turn-taking signal, to yield a determination;

when the determination indicates the utterance should be output, selecting a timing for when to output the utterance;

repeating the receiving, the processing, the selecting, and the determining throughout the speech dialog; and updating a first rule set used for the identifying of the importance of the user input and a second rule set for the identifying of the variable strength turn-taking signal in the user input.

18. The computer-readable storage device of claim 17, wherein the type of user is one of an expert and a novice.

* * * * *